(12) United States Patent
Bunout

(10) Patent No.: US 12,601,403 B2
(45) Date of Patent: Apr. 14, 2026

(54) ACTUATOR FOR A PARKING LOCK

(71) Applicant: Schaeffler Technologies AG & Co. KG, Herzogenaurach (DE)

(72) Inventor: Felix Bunout, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 326 days.

(21) Appl. No.: 18/567,398

(22) PCT Filed: Apr. 19, 2022

(86) PCT No.: PCT/DE2022/100294
§ 371 (c)(1),
(2) Date: Dec. 6, 2023

(87) PCT Pub. No.: WO2022/258096
PCT Pub. Date: Dec. 15, 2022

(65) Prior Publication Data
US 2024/0288070 A1 Aug. 29, 2024

(30) Foreign Application Priority Data
Jun. 7, 2021 (DE) ..................... 10 2021 114 493.0

(51) Int. Cl.
*F16H 63/34* (2006.01)
*B62D 63/02* (2006.01)

(52) U.S. Cl.
CPC ..... *F16H 63/3475* (2013.01); *F16H 63/3425* (2013.01); *B62D 63/02* (2013.01)

(58) Field of Classification Search
CPC ............. F16H 63/3475; F16H 63/3433; F16H 63/3483; B62D 63/02
See application file for complete search history.

(56) References Cited

U.S. PATENT DOCUMENTS

| 2016/0208916 A1* | 7/2016 | Kokubu | ................... B60T 1/062 |
| 2021/0197771 A1* | 7/2021 | Frister | ................. F16H 63/3475 |

FOREIGN PATENT DOCUMENTS

| DE | 102010043262 A1 | 5/2012 | |
| DE | 102011057057 A1 | 1/2013 | |
| DE | 102013213678 A1 | 1/2015 | |
| DE | 102015006323 A1 * | 11/2016 | ......... F16H 63/3483 |
| DE | 102018115548 A1 | 1/2019 | |
| EP | 2458226 A1 | 5/2012 | |
| JP | 2016168888 A * | 9/2016 | |
| WO | WO-2016031575 A1 * | 3/2016 | ......... F16H 63/3475 |
| WO | 2022258095 A1 | 12/2022 | |

* cited by examiner

*Primary Examiner* — Syed O Hasan

(57) ABSTRACT

An actuator for a parking lock includes an axial drive means for transmitting an axial force, an actuation element which can be axially moved from a first position into a second position via the axial force of the axial drive means, a stopper element, a stopper component which corresponds to the stopper element, and a holding element which can be moved between a released position and a locking position. The stopper element and the stopper component are fixed to each other when the actuation element is located in the second position while the holding element is in the locking position. A lifting magnet is provided, comprising a coil and a lifting piston, which can be axially moved via a magnetic force that can be generated by the coil. The holding element can be rigidly connected to the axially movable lifting piston.

20 Claims, 5 Drawing Sheets

13

ACTUATOR FOR A PARKING LOCK

CROSS-REFERENCE TO RELATED APPLICATIONS

This application is the U.S. National Phase of PCT Application No. PCT/DE2022/100294 filed on Apr. 19, 2022, which claims priority to DE 10 2021 114 493.0 filed on Jun. 7, 2021, the entire disclosures of which are incorporated by reference herein.

TECHNICAL FIELD

The disclosure relates to an actuator for a parking lock. The disclosure further relates to a parking lock for a parking lock device of a transmission, a parking lock device having such a parking lock, a transmission having such a parking lock device for a drive train, a drive train having such a transmission, and a motor vehicle having such a drive train.

BACKGROUND

Parking locks are known, for example, from DE 10 2018 115 548 A1. Motor vehicles with a parking lock, for example with a by-wire parking lock, in a normally locked configuration, i.e., with a blocked chassis in the event of a system failure, must be actively kept open while driving, with constant energy consumption. In the course of the electrification of motor vehicles, the energy requirement of all components is significant for the achievable range and therefore an energy-efficient operation of the parking lock when the motor vehicle is in motion must be striven for.

An actuation device for a parking lock unit is known from DE 10 2013 213 678 A1, in which a low holding current for an electromagnet is required to lock the parking lock unit in the open operating state. In addition, an unintentional opening of the parking lock unit can be prevented by not switching the electromagnet.

Proceeding therefrom, the object of the present disclosure is to at least partially overcome the disadvantages known from the prior art. The features described herein can be combined in any technically sensible way, wherein the explanations in the following description and features from the figures, which comprise additional embodiments of the disclosure, can also be used for this purpose.

SUMMARY

The disclosure relates to an actuator for a parking lock having at least the following components: an axial drive means for transmitting an axial force, an actuation element which has an actuation axis and which can be axially moved from a normal position into a deflected position by means of the axial force of the axial drive means, a stopper element, a stopper component which corresponds to the stopper element, and a holding element which can be moved between a released position and a locking position. The stopper element and the stopper component can be fixed to each other when the actuation element is located in the second position while the holding element is in the locking position.

The actuator can also have a lifting magnet with a coil and a lifting piston that can be axially moved by means of a magnetic force that can be generated by the coil. The holding element can be rigidly connected to the axially movable lifting piston.

The actuator is configured so that a magnetic flux generated by the coil is conducted through a return circuit. The return circuit comprises a radially inner return circuit and a radially outer return circuit. An axial gap can be present between the lifting piston and the inner return circuit in at least one of the two positions of the holding element. The magnetic flux is conducted through the two surfaces of the lifting piston and the inner return circuit which form the axial gap.

In the following, reference is made to the stated actuation axis when the axial direction, radial direction, or the circumferential direction and corresponding terms are used, unless explicitly stated otherwise. Unless explicitly stated otherwise, ordinal numbers used in the preceding and subsequent description are used only for the purposes of clear distinction and do not indicate an order or a ranking of designated components. An ordinal number greater than one does not necessarily mean that another such a component must be present.

The actuator proposed here comprises an axial drive means, for example an electric actuator with a spindle drive or a slave piston of a fluidic, i.e., pneumatic or hydraulic, actuation system. An axial force can be exerted along an actuation axis by means of the axial drive means and can be transmitted to the actuation element. The actuation element is, for example, a ram or rod, an axially movable spindle or an axially movable spindle nut. The actuation element is configured to transmit the axial force of the axial drive means to a locking mechanism. The actuation element is movably guided along an actuation axis, which can be moved axially from a (normal) first position into a (deflected) second position by means of the axial drive means. In an example embodiment, the actuation element can be returned to the normal position exclusively passively by a (storage) force which is antagonistic to the axial force of the axial drive means. Alternatively, the actuation element can additionally or alternatively be returned from the deflected position to the normal position by the axial drive means. The axial force of the axial drive means that can be transmitted by means of the actuation element is designed to overcome an antagonistic force of a first energy storage element and/or a locking mechanism, with a (normally locking) locking mechanism preferably being able to be converted from the locking state to the free state. Alternatively, conversely, a (normally open) locking mechanism can be converted from the free state to the locking state. Such a (first) energy storage element is designed, for example, as a helical compression spring, plate spring, magnetic spring or gas pressure spring. The first energy storage element can be designed as a helical compression spring with a spring axis that is parallel or coaxial with the actuation axis.

In order to be able to maintain the respective state of the locking mechanism with low energy, a stopper element is proposed here, which is configured to interact with a corresponding stopper component in such a way that a frictional and/or positive connection is formed. In an example embodiment, the stopper element is fixed to the axial drive means or to the actuation element, and the stopper component is fixed axially to an abutment of the axial drive means at least during the deflected position of the actuation element. Alternatively, this can be done the other way around. In an example embodiment, the stopper element is formed by at least one lug with a contact point, wherein the contact point can be brought into contact with the corresponding stopper component in order to apply the holding force. In an example embodiment, a (preferably switchable) magnetic (stopper) force is additionally generated, with which the stopper force resulting from the form fit and/or friction fit is supported. In an example embodiment, the stopper force is a force that supplements the axial force, and the (required) axial force to overcome the above-mentioned antagonistic force can be reduced by means of or while the stopper force is maintained, and consequently the energy consumption of the actuator is reduced. In another embodiment, the stopper force (without the cooperation of the holding element) can be negligible, wherein preferably no magnetic force is held between the stopper element and the corresponding stopper component.

In an example embodiment, the corresponding stopper component (or stopper element) (fixed in the deflected position) is axially fixed and thus fixed relative to the counter bearing of the axial drive means (for example the fluidic cylinder of a slave piston). In an alternative embodiment, the corresponding stopper component can be moved with the axial drive means or with the actuation element and is fixed in the second position by means of a stop.

The stopper force can be less than the antagonistic force to the axial force of the axial drive means to ensure that the parking lock assumes the normal state (whether it is normally locked or normally open). The antagonistic force for transferring the actuation element from the deflected position to the normal position is transferable. In a normally locking configuration of the parking lock, the axial force actively transfers the parking lock from the (normal) locking state to the (deviating) free state, wherein the normal position of the actuation element is in the locked state (parking position) and the deflected position corresponds to the free state (driving position). In the normal position, no axial force needs to be or is applied, so no external energy consumption is required from the axial drive means. The normal position of the actuation element can be secured by means of the storage power of a first energy storage element. An axial force is required to transfer the actuation element into the deflected position, wherein external energy consumption is necessary for this purpose.

In order for the stopper force to be sufficient to hold the actuation element in the deflected position (for example the driving position with a parking lock in a normally locking configuration), it is proposed here that a holding element is also provided. The holding element is movable between a locked position and a released position. In the locking position, the holding element fixes the state of the corresponding stopper component and the stopper element in the state that corresponds to the deflected position of the actuation element. A force is then transmitted by the holding element such that the resulting stopper force is sufficient to overcome the force antagonistic to the axial force of the axial drive means. In the case of a purely frictional connection between the stopper element and the corresponding stopper component, an additional holding force can be applied by the holding element to increase the frictional adhesion, such as by means of a connecting link, for example a ramp shape on the holding element and/or on the stopper element. At least the holding element forms a form fit with the stopper element in such a way that the stopper element is prevented from deviating. The possibility of an deviating movement (without action of the holding element) is intentional, so that the connection between the stopper element and the corresponding stopper component is automatically released as soon as the holding element is in the released position and the axial force of the axial drive means is sufficiently low, preferably minimal (for example zero or negative).

In an example embodiment, the (corresponding) stopper component is formed by means of an undercut (relative to the actuation axis), for example by means of a groove. In an example embodiment, the contact point of the stopper element is an elevation, preferably on a tip of the stopper element designed as a lug, which can be lowered axially behind the undercut, for example a groove, to form a form fit. In an example embodiment, the stopper element is formed by at least one spring lug with an axial main extent and a radial spring direction. In an example embodiment, in order to avoid tilting forces transversely to the actuation axis, an arrangement symmetrical to the actuation axis of partial elements of the stopper element and the stopper component, and preferably of the holding element, is formed, a ring-like arrangement. For example, the stopper element comprises a plurality of (preferably spring) lugs and the corresponding stopper component has a complementary receptacle, for example a circumferential counter surface or undercut (for example a groove). The holding element can be then likewise formed in a manner complementary to the plurality of lugs or in the shape of a ring.

The at least one spring lug is made, for example, from a metallic material, for example a spring steel sheet. In another embodiment, the spring lug is made from a plastic. In yet another embodiment, the at least one spring lug is integrally encompassed by the stopper element.

Here it is now proposed that a lifting magnet with a coil and an axially movable lifting piston by means of a magnetic force that can be generated by the coil is also provided, wherein the holding element is rigidly connected to the axially movable lifting piston. Thus, by energizing the coil, such a magnetic field can be induced with a magnetic force (can be switched off) resulting on the holding element, so that when the magnetic force is applied, the holding element is transferred from the locked position to the released position. This creates an electronic switchability of the fixing of the actuation element in the second position. In an example embodiment, the holding element and the lifting piston are formed in one piece with one another.

In an example embodiment, it is proposed that the two surfaces of the lifting piston and the inner return circuit are aligned with one another in such a way that when the coil is energized, the lifting piston is moved in the direction of the inner return circuit, so that the axial gap is reduced.

It is also proposed in an example embodiment of the actuator that the lifting magnet also includes an inner return circuit and an outer return circuit. An axial gap can be provided between the lifting piston and the inner return circuit at least outside one of the positions of the holding element, and the lifting piston and the inner return circuit can be brought into contact with one another.

The lifting magnet is designed in such a way that the coil is accommodated in an insulating and positioned manner by means of a magnetically non-conductive material (for example plastic), preferably by the inner return circuit. The return circuits can be formed from a ferromagnetic material. The inner return circuit is arranged radially closer to the actuation axis than the outer return circuit. In an example embodiment, the coil is arranged radially circumferentially around the actuation axis and is completely surrounded by the lifting magnet and the lifting piston. Then the holding element can also designed to be circumferential, for example ring-shaped, and guided coaxially to the coil and the return circuits. The stopper component (or stopper element) fixed in the second position of the actuation element can be fixed to the counter bearing of the axial drive means via the outer return circuit.

Both return circuits together form a U-shaped opening in which the lifting piston is arranged. The lifting piston is arranged between the inner return circuit and the outer return circuit in such a way that an axial movement can be carried out within the axial extent of one of the return circuits, namely between the locked position and the released position. The lifting piston is guided in its axial movement by means of one of the return circuits (in an example embodiment, by means of the outer return circuit) and secured against wedging and/or loss.

By means of the axial movement of the lifting piston, there is therefore an axial gap between the lifting piston and one of the return circuits (in an example embodiment, the inner return circuit) in one of the positions. In an example embodiment, the axial gap is provided at least in the locking position.

In an example embodiment, the axial gap is closed in the (maximum) other (then, for example, released) position. The lifting magnet is then configured, for example, in such a way that the lifting piston can be brought into contact with the inner return circuit, i.e., the magnetic force is configured to be so large that the axial gap approaches zero. It should be pointed out that in an alternative embodiment there is an axial gap between the lifting piston and the outer return circuit and the two components can be brought into contact. Furthermore, it should be pointed out that in an example embodiment an axial gap is permanently present.

The axial gap is such a gap between the lifting piston and the corresponding return circuit, which comprises an axial vector component, such that an axial reciprocating movement of the lifting piston (and thus of the holding element) is possible.

It is further proposed in an example embodiment of the actuator that the gap normal of the axial gap is inclined and/or aligned purely axially.

The axial gap between the return circuits and the lifting piston is such that, depending on the embodiment of the lifting piston and the complementary return circuit, the gap is a purely axially aligned axial gap, i.e., parallel to the actuation axis. In an example embodiment, the axial gap has a radial vector component, wherein a gap normal to the axial gap is oriented at an angle to the actuation axis, i.e., the two surfaces that form the axial gap are conical in relation to the actuation axis. In an example embodiment, the axial gap comprises a plurality of sections with gap normals oriented differently from one another, for example in one section the gap normal is oriented purely radially.

In an example embodiment, in which a circumferential axial gap is formed (for example, a ring-shaped holding element and/or a complementary return circuit), it assumes a conical shape, which can be a rotationally symmetrical conical shape. The geometry of the respective ends of the complementary components (holding element and return circuit) have a direct influence on the magnetic force. Depending on the orientation of the magnetic field lines within the return circuits and the immersion of the component geometry of the lifting piston in the lifting magnet, a different magnetic force or a different axial vector component of the magnetic force results. If the axial stroke of the lifting piston is relatively small, for example less than or equal to 0.5 mm [five tenths of a millimeter], a purely axial alignment of the gap normal is advantageous for a large magnetic force or a low energy consumption and/or size of the coil. Conversely, for a relatively large axial stroke of the lifting piston, for example greater than 0.6 mm [six tenths of a millimeter], an inclined (in an example embodiment, conical) alignment of the gap normal for the entire axial stroke (and especially at the maximum of the gap extent of the axial gap) of the lifting piston can be advantageous for a large magnetic force or a low energy consumption and/or size of the coil.

It is also proposed in an example embodiment of the actuator that the lifting magnet also includes a second energy storage element, which provides a pre-holding force on the lifting piston that is antagonistic to the magnetic force, wherein the magnetic force can be a tensile force.

It is proposed here that the lifting magnet comprises a second energy storage element. In this case, this second energy storage element is designed in such a way that it applies a pre-holding force to the lifting piston counter to the magnetic force of the lifting magnet. Thus, by means of the second energy storage element, the lifting piston (i.e., the holding element) is held passively in the locking position and can only be actively transferred into the released position by energizing the coil of the lifting magnet. For a parking lock in a normal locking configuration, the actuating actuator is designed in such a way that when electrical energy is supplied to the coil, the holding element changes from its locking position to its released position, thus changing the parking lock from a (passively secured) free state to the (normal, i.e., passive) locking state. The reverse is true for a parking lock in a normally-open configuration.

In this embodiment, the coil inducing the magnetic force is designed such that the magnetic force (relative to the lifting piston) is a tensile force. Due to the tensile force, the active (resulting from the energization of the coil) axial movement of the lifting piston is directed in the direction of the coil. The second energy storage element is dimensioned in such a way that the minimum (active) magnetic force is greater than the (correspondingly minimum or maximum) pre-holding force. Only when the magnetic force is switched off (i.e., is zero or is sufficiently low) can the holding element return to the released position. When the stopper element and the stopper component are in a state corresponding to the deflected position of the actuation element, the actuation element is then held in the second position without external energy consumption (i.e., passively). As soon as the holding element is transferred into the released position by the magnetic force, the stopper element and the stopper component become detached from one another unless a sufficient (active) axial force is applied by the axial drive means. In the case of latching (groove and lug), the fixing of the stopper element from the stopper component is canceled and the stopper element slides out of the stopper component due to the storage force (of a first energy storage element) that is antagonistic to the axial force.

The second energy storage element is designed, for example, as a helical compression spring, plate spring, magnetic spring or gas pressure spring. The second energy storage element can be designed as a helical compression spring with a spring axis that is parallel or coaxial with the actuation axis. For example, the diameter of the second energy storage element is limited by the diameter of the actuator and/or by the wall thickness of the holding element, so that the energy storage element can act radially circumferentially on the holding element. In another embodiment, the second energy storage element comprises a plurality of separate springs (such as helical compression springs), which are arranged circumferentially and act on the holding element at specific points.

An embodiment is also proposed according to which the coil is accommodated by the inner return circuit, the inner return circuit is arranged coaxially to the actuation axis and the actuation element and/or a slave piston comprised by the axial drive means at least partially overlaps axially. This means that the inner return circuit and the actuation element or the slave piston are at least partially nested.

According to a further development of the disclosure, it is provided that the outer return circuit is rigidly connected to the inner return circuit via an interference fit. As a result, a particularly simple assembly and construction of the actuator is possible.

According to a further aspect, a parking lock is proposed for a parking lock device of a transmission having at least the following components:

a locking mechanism for locking a ratchet wheel in a torque flow, and while in use, the locking mechanism blocks the ratchet wheel in a locked state and releases the ratchet wheel in a free state; and an actuator according to an embodiment of the above description, and in the deflected position of the actuation element, the locking mechanism is brought out of the locking state, and the normal position of the actuation element corresponds to the locking state of the locking mechanism.

The parking lock proposed here is configured in such a way that the locking mechanism blocks the ratchet wheel in a locking state and the ratchet wheel is released from the locking mechanism only in a free state. In the free state, the ratchet wheel is freely rotatable, for example used in a transmission of a motor vehicle; the motor vehicle can then be rolled. It should be noted that the ratchet wheel is integrated in a torque flow of a transmission. If the actuation element is introduced into the locking state, the torque flow is blocked by means of the locking mechanism and the transmission is locked. When the ratchet wheel is in the locked state, the motor vehicle cannot be rolled in such an application in a transmission. The parking lock comprises an actuator with an actuation element, which is connected to the locking mechanism. The actuation element is connected to the locking mechanism in such a way that when the actuation element is in the deflected position, the state in the locking mechanism that deviates from the normal state is present. In the case of a parking lock in a normally locking configuration, the free state can therefore be actively brought about by means of the actuator. However, the state deviating from the normal state does not have to be held actively (i.e., under external energy consumption), but is held passively by the stopper element and the stopper component with the support of the holding element. When the coil of the lifting magnet is energized, the stopper element is separated from the stopper component and the actuation element is thus (preferably passively) transferred from the deflected position to the normal position. The locking mechanism is thus free to return to the normal state from the deviated state.

It is also proposed in an example embodiment of the parking lock that an unlocking element is further provided, which is movable between a normal position and an unlocking position, and in the unlocking position, the free state of the locking mechanism is maintained and in the normal position the normal locking function of the parking lock is ensured.

The parking lock is actuated, for example, electrically and/or fluidically, for example pneumatically or hydraulically, and if the electronics fail or a fluidic pressure or fluidic volume drops, the locking mechanism is switched to the normal (for example, locking) state. With a parking lock in the normal locking configuration, the ratchet wheel is then blocked. In order to switch this off during a passive state (e.g., in a motor vehicle during production, transport or in a workshop), it is proposed here that an unlocking element be provided which can be moved between two positions (e.g., designed as a pivoting lever mounted around a pivoting axis). The unlocking element is configured in such a way that the deviating (for example free) state of the locking mechanism can be maintained with the unlocking element in the unlocking position without external energy consumption. In this passive state, it is thus ensured that when the (normally locking) parking lock is used in a transmission of a motor vehicle, the motor vehicle can still be rolled. In order to eliminate this passive state, which is precisely undesirable when the parking lock is in operation, the unlocking element can be deactivated again (preferably repeatedly), i.e., it can be converted into the normal position.

In an example embodiment, a locking element is additionally provided. The locking element is designed to hold the unlocking element in the unlocked position. If the locking element does not hold the unlocking element in the unlocking position, the free state of the locking mechanism cannot be (passively) maintained by the unlocking element. This means that the unlocking position of the deviating (and thus, in the case of a parking lock in normally locking configuration, the free) state of the locking mechanism can only be adjusted (permanently) in cooperation with the unlocking element and the locking element.

According to a further aspect, a parking lock device is proposed, having a ratchet wheel arranged in a lockable torque flow and a parking lock according to an embodiment of the above description, wherein the ratchet wheel can be blocked by means of the locking mechanism.

The parking lock device proposed here comprises a parking lock and a corresponding ratchet wheel. The ratchet wheel is integrated in a lockable torque flow of a drive train of a motor vehicle, such as in a transmission, and can be blocked according to the previous description.

In an example embodiment, the parking lock and the ratchet wheel form a structural unit. Such a structural unit can be delivered for installation as an integral component and can be mounted at the intended assembly location, for example in a motor vehicle, without the need to dismantle said structural unit again. In an example embodiment the ratchet mechanism, and in an example embodiment also the ratchet wheel, is one assembly while the actuator is formed separately, wherein in an example embodiment the actuator forms a separate further assembly. When installed in a drive train of a motor vehicle, for example, the ratchet wheel is arranged in such a way that at least one of the consumers is prevented from transmitting or absorbing torque when the locking mechanism is in the locking state, i.e., the ratchet wheel is blocked.

According to a further aspect, a transmission is proposed for a drive train, having at least the following components:

a parking lock device according to an embodiment as described above;

a torque transmission gear, which comprises the ratchet wheel; and a transmission housing, which surrounds a transmission compartment.

The locking mechanism of the parking lock, or the entire parking lock device, is arranged in the transmission compartment.

The transmission, for example an automatic transmission for a drive train of a motor vehicle, comprises the ratchet wheel. For example, the ratchet wheel forms a spur gear of a torque transmission gear designed as a switchable transmission. The transmission has a torque input, for example one or more transmission input shafts, and a torque output, for example one or more transmission output shafts. In the transmission, the torque is diverted, reduced, converted and/or distributed per specification (as a differential).

In an example embodiment, the transmission comprises a clutch, for example a friction clutch or a dog clutch in the torque flow. The torque input is arranged on the drive engine side and the torque output is arranged on the consumer side. However, the direction of the torque is also possible in reverse, from a consumer (in the case of recuperation) to a drive engine or a generator. In an advantageous embodiment of the transmission, it is also proposed that the parking lock be integrated in its entirety or only the locking mechanism in a transmission compartment of the transmission formed by a transmission housing.

According to a further aspect, a drive train is proposed, having at least the following components:

at least one drive engine for delivering a torque;
  at least one consumer for receiving a torque; and
  a transmission according to one embodiment of the above
    description, and the at least one drive engine and the at least one consumer are connected to one another in a torque-transmitting manner by means of the transmission. The torque transmitted between the drive engine and the at least one consumer is prevented by means of the parking lock device when the locking mechanism is in the locking state.

The drive train proposed here comprises at least one drive engine, for example an internal combustion engine and/or an electric drive engine, which forms the torque source of a torque flow at least in a main state. Furthermore, at least one consumer is included, for example drive wheels of a motor vehicle, which forms the torque sink of the torque flow at least in a main state. Interposed is a transmission according to an embodiment according to the preceding description, via which the torque flow (preferably the entire wheel side) is conducted. When the transmission is locked, the flow of torque is locked and torque transmission in the drive train between the torque source and the torque sink is prevented.

The drive train proposed here comprises a transmission which has a parking lock device with which both the driving position (free state) and the parking position (locking state) can be maintained passively, i.e., without external energy consumption. In addition, with a very low power consumption (of the coil of the lifting magnet), the deviating (e.g., free) state of the parking lock can be canceled again and thus the assumption of the normal (e.g., locking) state of the parking lock is ensured in almost all cases, even in the event of a failure of the electronics, for example using a local electrical capacitor as emergency storage. The transmission can be designed with the same installation space and with only minor additional costs compared to a parking lock device without the possibility of unlocking. In addition, the security is high, such that the drive train is only put into operation as long as the parking lock device is unlocked.

According to a further aspect, a motor vehicle is proposed, having at least one drive wheel and a drive train according to an embodiment of the above description, wherein in order to propel the motor vehicle, a torque can be transmitted from the at least one drive engine of the drive train to the at least one drive wheel, and rolling of the motor vehicle is prevented by means of the parking lock device in the locking state of the locking mechanism.

The motor vehicle is, for example, a passenger car, a truck or a motorized two-wheeler. The motor vehicle has a drive train according to an embodiment according to the preceding description. The torque that can be output by the at least one drive engine is output to the at least one drive wheel (consumer) via the transmission. The transmission referred to here can be a shiftable transmission gear. Alternatively, the transmission is, for example, a fixed transmission, i.e., with an unchangeable transmission, or a differential or a slip clutch. The parking lock device proposed here is can be designed as described above and possibly integrated into the transmission.

A rotational movement of the at least one drive wheel is only possible in a parking circuit position when the parking lock (and the legally required parking brake) are released. Otherwise, reference is made to the preceding description.

The drive train of the motor vehicle proposed here comprises a transmission which has such a parking lock device with which both the driving position (free state) and the parking position (locking state) can be maintained passively, i.e., without external energy consumption. In addition, with a very low power consumption (of the coil of the lifting magnet), the deviating (e.g., free) state of the parking lock can be canceled again and thus the assumption of the normal (e.g., locking) state of the parking lock is ensured in almost all cases, even in the event of a failure of the electronics, for example using a local electrical capacitor as emergency storage. The transmission can be designed with the same installation space and with only minor additional costs compared to a parking lock device without the possibility of unlocking. In addition, the security is high, such that the motor vehicle is only put into operation as long as the parking lock device is unlocked.

BRIEF DESCRIPTION OF THE DRAWINGS

The disclosure described above is explained in detail below against the pertinent technical background with reference to the accompanying drawings, which show example embodiments. The disclosure is in no way restricted by the purely schematic drawings, wherein it should be noted that the drawings are not dimensionally accurate and are not suitable for defining proportions. In the figures.

DETAILED DESCRIPTION

Figure 1:
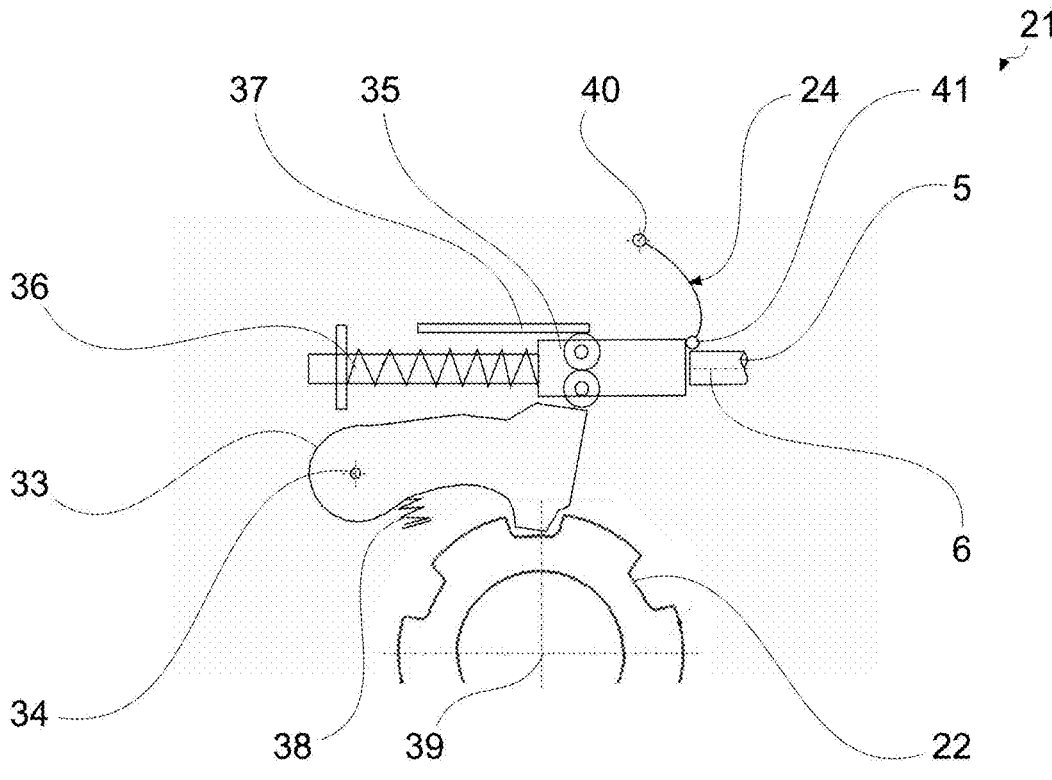
FIG. 1: shows a locking mechanism of a parking lock in the locked state.

FIG. 1 shows a locking mechanism 21 of a parking lock 2 (see FIG. 9) in a normally locking configuration in a locking state in a schematic side view with a ratchet wheel 22. The locking mechanism 21 comprises a parking lock pawl 33 which is mounted such that it can rotate about its pawl axis 34 and is shown here in the locked state. When the locking mechanism 21 is brought into the locked state, the parking lock pawl 33 is positively engaged with the ratchet wheel 22 so that the ratchet wheel 22 is blocked. Then a traverse 35 is forced by a pretensioning spring 36 (shown here as a compression spring) into such a position that here (purely optional by means of the traverse 35 being supported on a fixed frame 37, for example part of a gear housing 27, see FIG. 9) the parking pawl 33 is geometrically blocked in the locked state (tooth-in-gap engagement on the ratchet wheel 22). In a free state of the traverse 35 (not shown here), the pretensioning spring 36 is tensioned (compressed here to the left as shown). In this embodiment, the parking pawl 33 is lifted out of a tooth gap of the ratchet wheel 22 by means of a release spring 38 (for example a torsion spring or compression spring).

Figure 2:
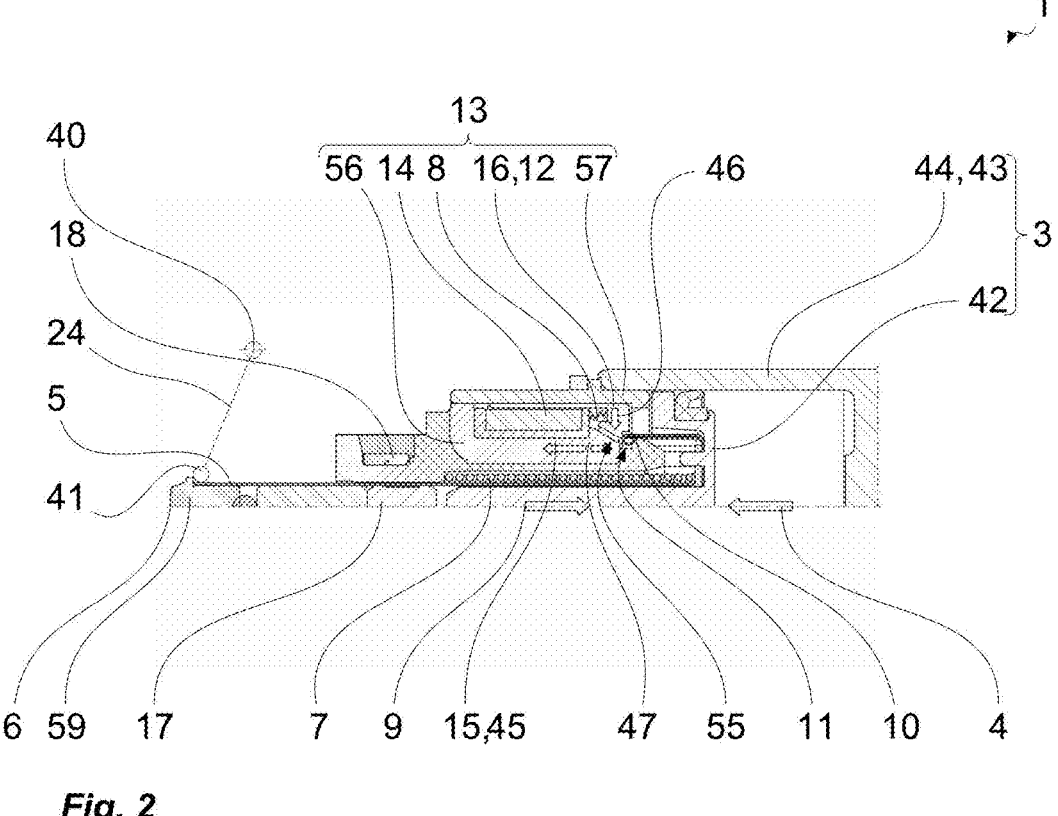
FIG. 2: shows an actuator with an actuation element in the deflected position.
Figure 3:
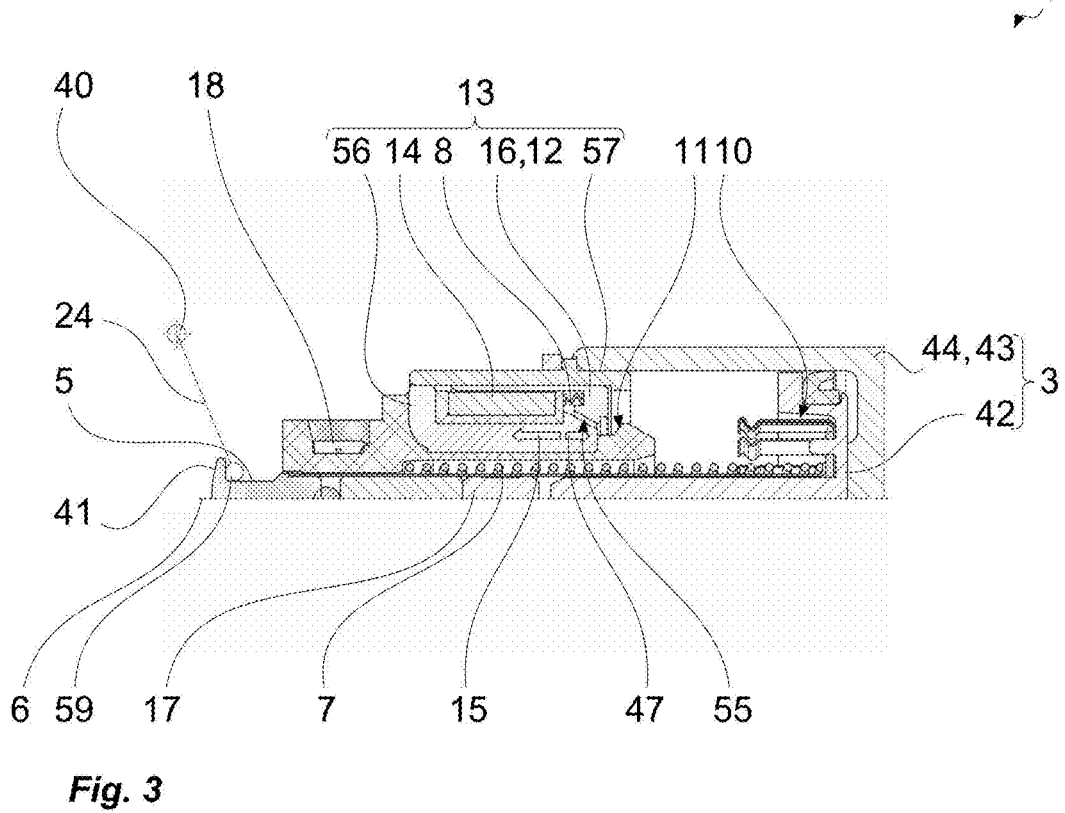
FIG. 3: shows an actuator according to FIG. 2 with the actuation element in the normal position.

In the normal state, the parking lock pawl 33 can only be transferred from the engaging (locking) state to the free state in such a way that an actuation element 5 (shown here on the right) of an actuator 1 actively acts with an axial force 4 in the opposite direction to the pretensioning by means of the pretensioning spring 36 against the traverse 35 (shown here to the left) and tensions the pretensioning spring 36. The actuator 1 is designed, for example, as shown in FIGS. 2 and 3. The parking lock pawl 33 thus remains in the free state as long as the traverse 35 is deflected by the actuation element 5 of the actuator 1 and the ratchet wheel 22 can rotate freely about its wheel axis 39.

In this example embodiment, the parking lock 2 further comprises, purely optionally, an unlocking element 24, which in the embodiment shown is a lever that can be pivoted about a pivot axis 40. Purely optionally, the pivot axis 40 runs perpendicular to the actuation axis 6. The unlocking element 24 shown here acts with its actuation tip 41 (purely optionally directly) on the traverse 35, so that in this embodiment the parking lock pawl 33 can be transferred from the engaged (locking) state to the free state by pivoting clockwise about the pivot axis 40. The actuation element 5 can remain in its first position (parking position).

FIG. 2 shows an actuator 1 having an actuation element 5 in a deflected position in a schematic sectional view. The actuator 1 is configured, for example, to actuate a locking mechanism 21 according to FIG. 1. The actuation element 5 can be actively moved along an actuation axis 6 by means of an axial drive means 3, so that the actuation element 5 can be moved from right to left according to the illustration. The axial drive means 3 is designed here as a fluid, such as hydraulic, slave unit. Controlled by a fluid, a slave piston 42 in a slave cylinder 43 (counter bearing 44) is pushed from a normal (here first) position into a deflected (here second) position. The resulting axial force 4 thus forces the actuation element 5 to the left, as shown. In this case, no tensile force can be transmitted to the actuation element 5 by the slave unit. Rather, the actuation element 5 is pretensioned to the right as shown in the drawing by means of a first energy storage element 7 (here a helical compression spring arranged coaxially to the actuation axis 6). A storage force 9 that is antagonistic to the axial force 4 is therefore exerted by the first energy storage element 7 on the slave piston 42 and thus on the actuation element 5. Without external energy consumption (here in the form of a fluidic pressure), the normal position (see FIG. 3) is assumed by the actuation element 5 (passively).

A stopper element 10 is provided here, which is rigidly connected to the axial drive means 3. The stopper element 10 is designed here as a latching element, more precisely as (a plurality of) spring lugs, with a contact point. The corresponding stopper component 11 is rigidly connected to the counter bearing 44 of the axial drive means 3. The stopper component 11 is designed here as a complementary snap-in receptacle, wherein the contact point of the stopper element

10 can be held in place by means of a corresponding undercut. When a sufficient axial force 4 of the axial drive means 3 is applied, the stopper element 10 therefore slides into the stopper component 11, which is designed here as an undercut (positive locking), such as in the manner of a snap lock. In this case, the stopping force 45 is so small that it alone cannot be used to protect against the storage force 9 of the first energy storage element 7. Rather, the storage force 9 is so great that the connection between the stopper element 10 and the stopper component 11 can thus be released, so that the actuation element 5 is passively transferred to the normal position. If sufficient axial force 4 is not generated, the stopper element 10 slides out of the stopper component 11 and the operating element 5 assumes the normal position.

Because in a motor vehicle 32 the deflected position (with the locking mechanism 21 according to FIG. 1 driving position) is a permanent state during operation, little or no external energy consumption is desired here. A holding element 12 is provided here for this purpose. The stopper element 10 is (at least additionally) secured by means of the holding element 12 against sliding out during the deflected position, here by means of a form fit (snap closure). The holding force 46 of the holding element 12 is sufficient to fix the connection between the stopper element 10 and the stopper component 11 against the storage force 9 of the first energy storage element 7.

In this embodiment, the holding element 12 itself is pretensioned by a second energy storage element 8 into the locking position shown by means of a pre-holding force 47 and thus secures the contact point of the spring lug (stopper element 10) in the locking groove (stopper component 11). When the coil 14 is energized, such a magnetic field is generated that a magnetic force 15 pointing in the direction of the axial force 4 is applied to the lifting piston 16 and thus to the holding element 12 formed in one piece therewith. The pre-holding force 47 is overcome and the stopper element 10 detaches from the stopper component 11 when a sufficiently small (e.g., negligible) axial force 4 is applied. As a result of the storage force 9 of the first energy storage element 7, the actuation element 5 is returned to the normal position.

In the embodiment shown, the lifting magnet 13 comprises an inner return circuit 56 and an outer return circuit 57 which surround the lifting piston 16 in a U-shape. (The main part of) the magnetic field of the coil 14 runs in these return circuits 56, 57. On the one hand, the lifting piston 16 is actuated as in the case of a plunger coil and, on the other hand, an axial gap 55 (inclined here) is provided, wherein a stop for the axial movement of the lifting piston 16 can be formed here at the same time. The axial gap 55 has an axial extent which is equal to the desired stroke of the holding element 12 for releasing and locking the stopper element 10.

Furthermore, in the embodiment shown (purely optionally) a magnetic field sensor 18 and a position magnet 17 (permanent magnet) are provided, wherein the magnetic field sensor 18 is fixed relative to the counter bearing 44 of the axial drive means 3 and the position magnet 17 being integrated into the actuation element 5. The position of the actuation element 5 can thus be recorded or determined electronically.

Furthermore, in the embodiment shown (purely optionally), the actuation element 5 is formed separately from the axial drive means 3, here the slave piston 42. This is advantageous if the locking mechanism 21 is to be unlocked. Then the slave piston 42 can return to the passive position while the actuation element 5 is still in the deflected position. In an example embodiment, the actuation element 5 can be transferred into the deflected position exclusively by means of the axial drive means 3. In the embodiment shown, an unlocking element 24 is additionally provided (purely optionally). The unlocking element 24 can be used to transfer it into the deflected position from the outside (for example via a screw or a push button). This represents an advantageous variant compared to the embodiment according to FIG. 1, because the magnetic field sensor 18 can be used as a result. A display or an electronic locking of the activation of a motor vehicle 32 (for example via the on-board computer of the motor vehicle 32) can thus be easily implemented.

The unlocking element 24 is designed here to be pivotable about a pivot axis 40, alternatively designed to be linearly movable. The actuation tip 41 of the unlocking element 24 acts directly against a flange of the actuation element 5, which is arranged here (purely optionally) on its lock-side tip. The unlocking element 24 is therefore pivoted clockwise to the left according to the illustration. The actuation element 5 is forced into the first position by means of the force-transmitting contact from an actuation tip 41 to the actuating head 59. The actuation element 5 is held in the first position against the storage force 9 of the first energy storage element 7. It should be noted that the actuation element 5 is not capable of being held in the deflected position shown by the unlocking element 24, but by means of the interaction of the stopper element 10, the stopper component 11 and the holding element 12 (or the second energy storage element 8). An additional locking element for holding the unlocking element 24 in the pivoted-out position shown is therefore not necessary. For example, the unlocking element 24 is pre-tensioned into a normal position opposite the unlocking position shown and automatically (passively) returns to the normal position after actuation. Alternatively, the unlocking element 24 is freely movable or is permanently carried along with the actuation element 5.

FIG. 3 shows an actuator 1 according to FIG. 2 with the actuation element 5 in the normal position. The slave piston 42 is returned to the normal position by means of the storage force 9 of the first energy storage element 7. The (purely optional) embodiment of the stopper element 10 as a plurality of spring lugs which are arranged coaxially to the actuation axis 6, and which are rigidly connected here to the slave piston 42, can be clearly seen here. Furthermore, the (purely optional) embodiment of the holding element 12 as an encircling ring can be understood. It should be pointed out that the holding element 12 is again in the locking position, that is to say the coil 14 is not energized or is energized to a sufficiently low degree, so that the pre-holding force 47 transfers the holding element 12 into the locking position. The axial force 4 is able to overcome the pre-holding force 47 and thus to latch the stopper element 10 to the stopper component 11, whereupon the holding element 12 returns to the locking position. The whole process can be carried out without actuating the coil 14.

Figure 4:
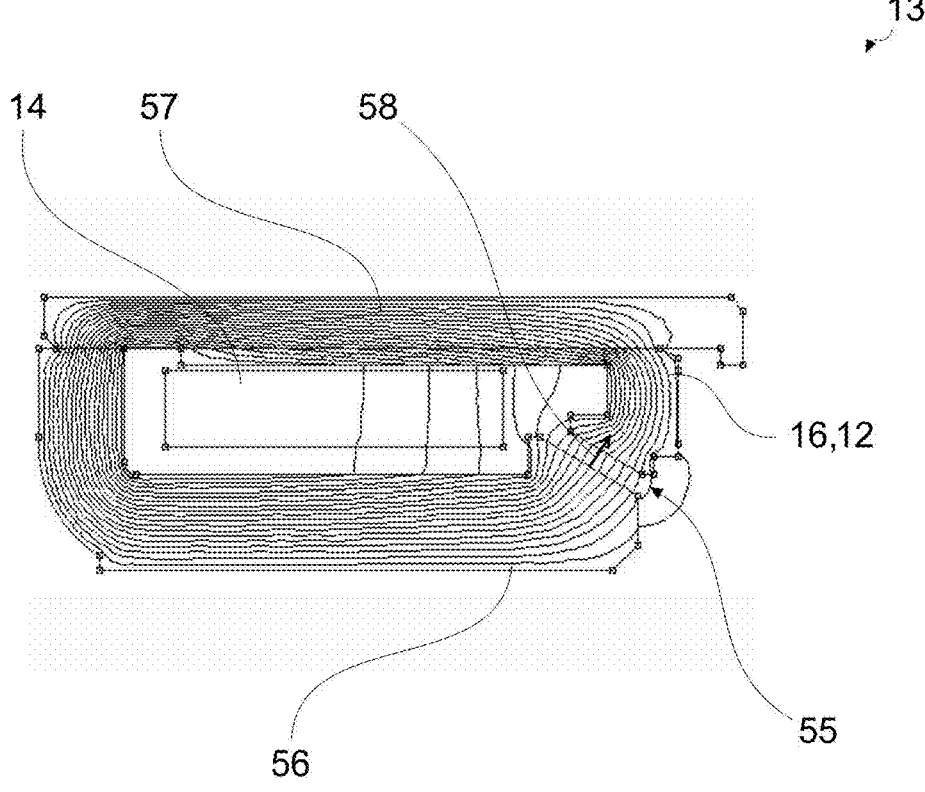
FIG. 4: shows a lifting magnet with an axial gap in a conical embodiment.

FIG. 4 shows a lifting magnet 13 having an axial gap 55 in a conical embodiment in a schematic sectional view. In this view, the outlines of the individual components of the lifting magnet 13 and the magnetic field lines of the current-carrying coil 14 are shown inside and outside the components for clarification. In this embodiment, the lifting magnet 13 comprises an inner return circuit 56, an outer return circuit 57, as well as a coil 14 and a lifting piston 16 (as shown in FIGS. 2 and 3). The lifting piston 16 here comprises a holding element 12 which can be manufactured in one piece with the lifting piston 16. In this embodiment, the lifting piston 16 is guided within the outer return circuit 57 and the coil 14. The two return circuits 56, 57 enclose the coil 14 and form a U-shaped opening at the right end as shown in the illustration, in which the lifting piston 16 is mounted so that it can move axially in such a way that the axial gap 55 is formed here between the inner return circuit 56 and the holding element 12. In this embodiment, the end of the inner return circuit 56 facing away from the coil is conical, as is the lower end of the lifting piston 16 as shown.

Due to the geometry of the inner return circuit 56 and the lifting piston 16, in this embodiment there is an axial gap 55 with a gap normal 58 at an angle between the actuation axis 6 and the radial line of the actuation axis 6 (see FIG. 2). The conical design of the axial gap 55, with a gap normal 58 inclined to the actuation axis 6, results in an increase in the magnetic field line density in this axial spacing between the holding element 12 and the inner return circuit 56, which leads to an increased magnetic force 15 compared to a purely axial axial gap 55 (see FIG. 5).

Figure 5:
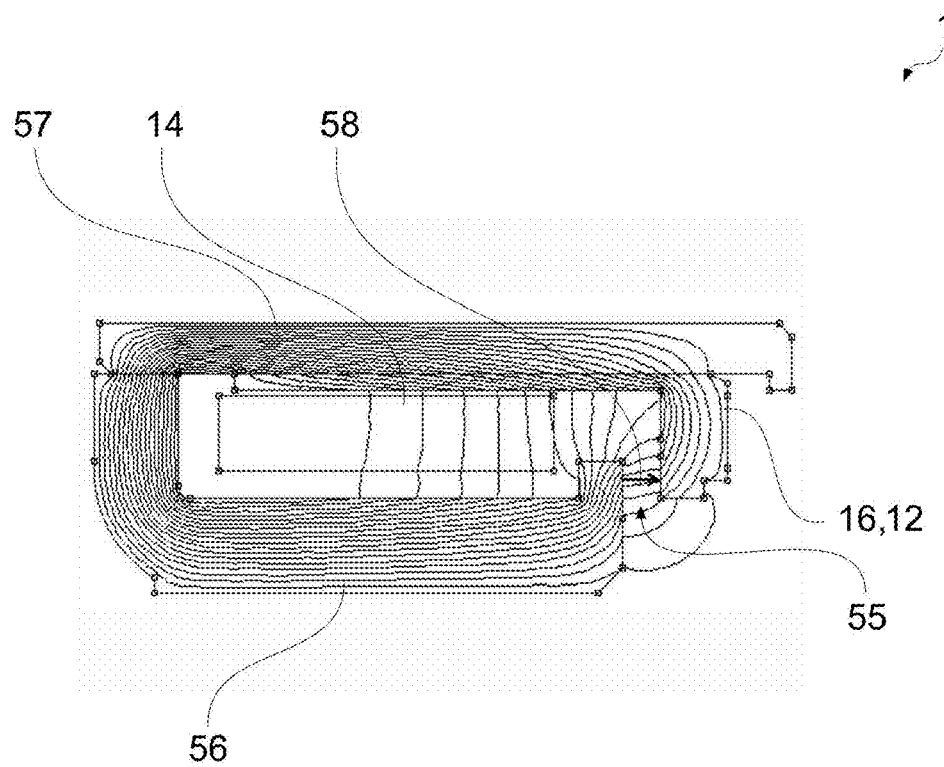
FIG. 5: shows a lifting magnet with an axial gap in a purely axial embodiment.

FIG. 5 shows a schematic sectional view of a lifting magnet 13 with an axial gap 55 in a purely axial embodiment. In this view, the outlines of the individual components of the lifting magnet 13 and the magnetic field lines of the current-carrying coil 14 are shown inside and outside the components for clarification. This embodiment is largely identical to the embodiment shown in FIG. 4 for the sake of clarity, without excluding generality, so that reference is made to the description there and only the differences are discussed here.

In this embodiment, the end of the inner return circuit 56 facing away from the coil is purely axial, as is the lower end of the lifting piston 16 as shown. This embodiment of the ends of the lifting piston 16 and the inner return circuit 56 results in a lower magnetic field line density within the axial gap 55 than in the conical embodiment in FIG. 4. A lower magnetic field line density induces a lower magnetic force 15 which pulls the lifting piston 16 towards the coil 14. The axial gap 55 comprises a gap normal 58 which has a purely axial orientation here. It should be pointed out that if the distance between the holding element 12 and the inner return circuit 56 is greater, a smaller magnetic force 15 is required in order to pull the lifting piston 16 towards the coil 14. This means that depending on the axial stroke of the lifting piston 16, either the geometry according to FIG. 4, or as shown here, is more advantageous.

Figure 6:
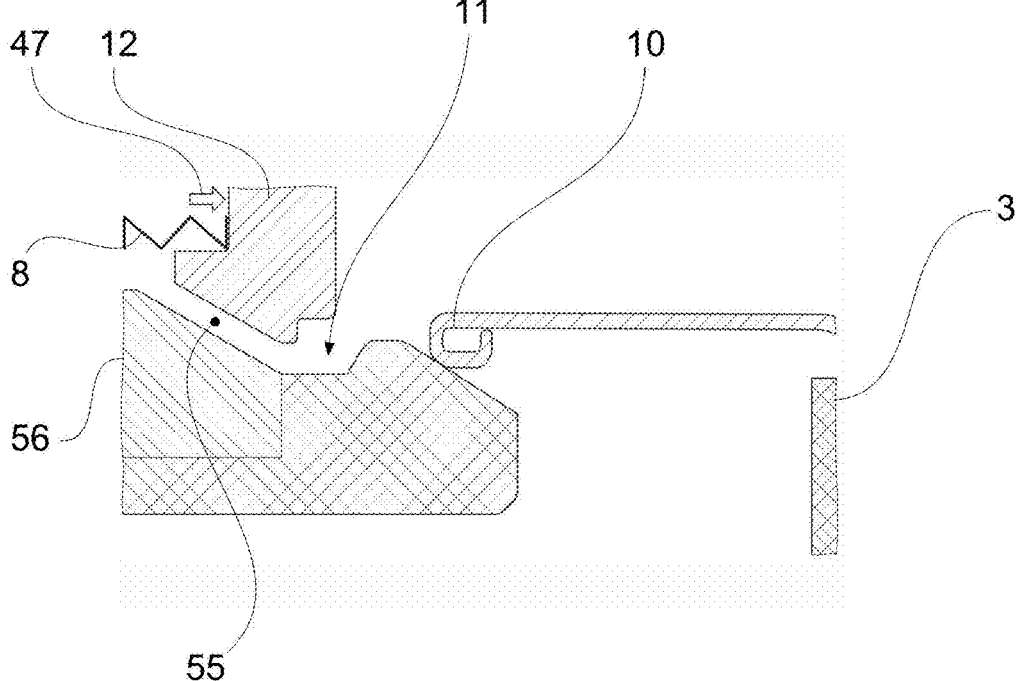
FIG. 6: shows a holding element with a snap-in receptacle (stopper)

FIG. 6 shows a schematic sectional view of a holding element 12 with a stopper component 11, which is designed as a snap-in receptacle, and a stopper element 10, which is designed as a snap-in element, more precisely as a snap hook. The snap-in receptacle (stopper component 11) is designed in such a way that a corresponding snap-in element (stopper element 10) can be accommodated. The holding element 12 is configured to fix the stopper element 10 in the stopper component 11 and is pretensioned to the right by the pre-holding force 47 of the second energy storage element 8 according to the illustration and can be moved to the left by the magnetic force 15 of the lifting magnet 13 according to the illustration (see FIGS. 2 to 5).

Figure 7:
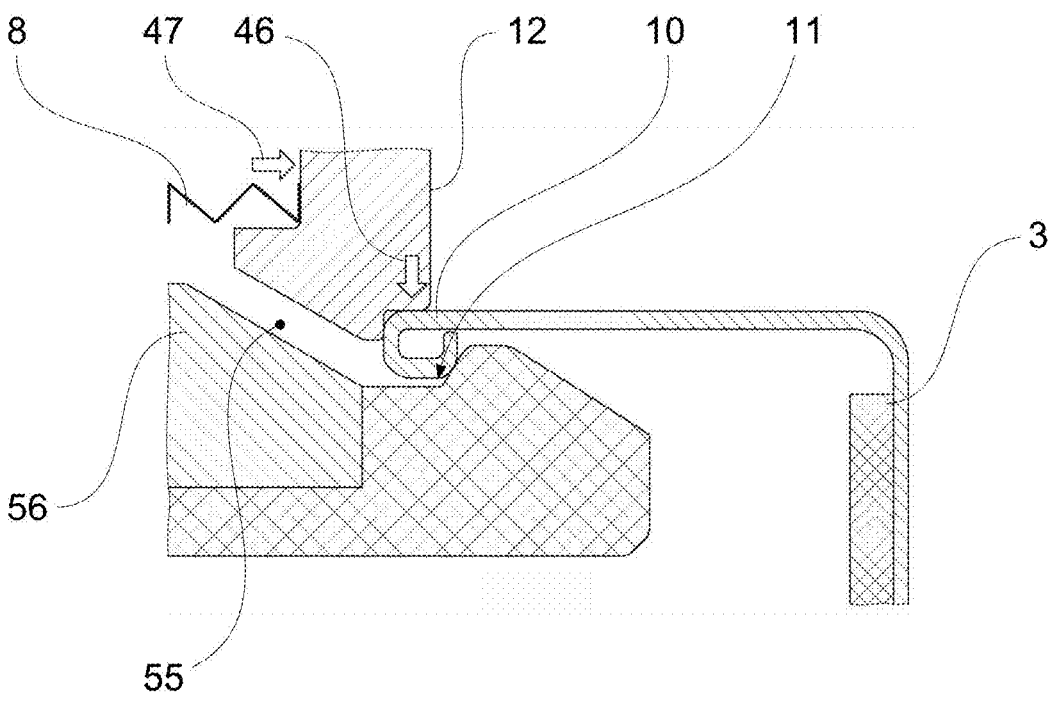
FIG. 7: shows the holding element according to FIG. 6 in the locked position.

FIG. 7 shows the holding element 12 according to FIG. 6 in the locking position. The holding force 46 of the holding element 12 results from the contact guiding the holding element 12 when the holding element 12 is held in the shown relative (locking) position by means of the pre-holding force 47 while the stopper element 10 is accommodated in the stopper component 11. In this way, the actuation element 5 is fixed axially in the deflected position, without external energy consumption being necessary.

Figure 8:
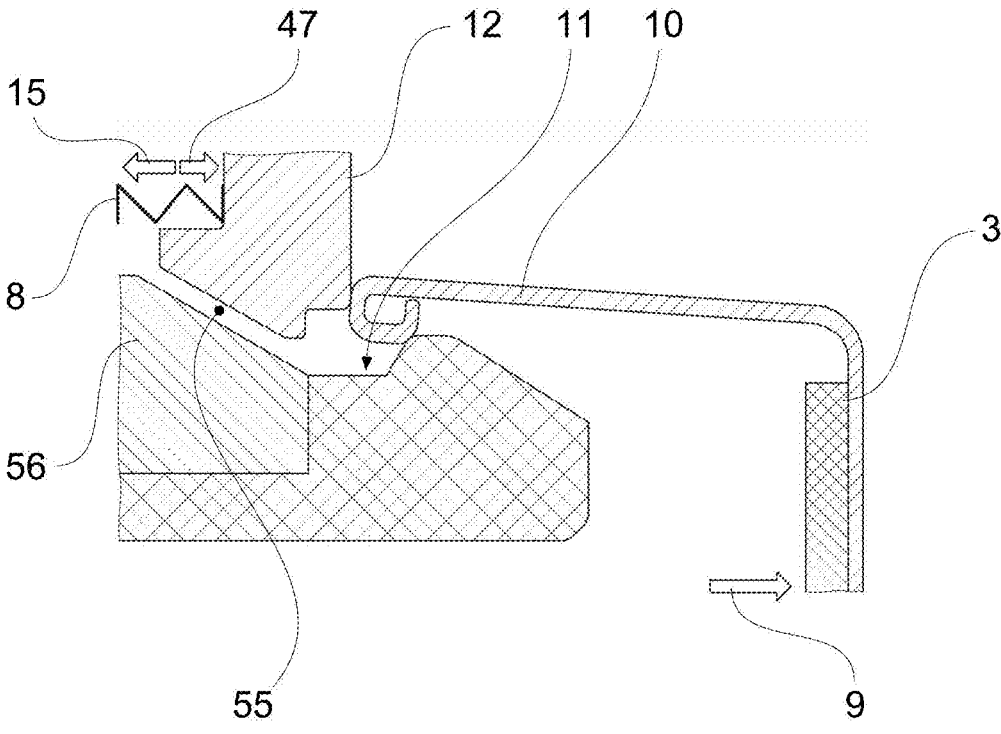
FIG. 8: shows the holding element according to FIGS. 6 and 7 in a releasing position.

FIG. 8 shows the holding element 12 according to FIG. 6 and FIG. 7 in a releasing position. The holding force 46 of the holding element 12 is canceled in that the pre-holding force 47 of the second energy storage element 8 is overcome by the magnetic force 15. If there is no (or too little) axial force 4, the actuation element 5 is now moved out of the deflected position again, because the storage force 9 of the first energy storage element 7 causes a radial deflection of the stopper element 10 and the stopper element 10 is released from the stopper component 11.

Figure 9:
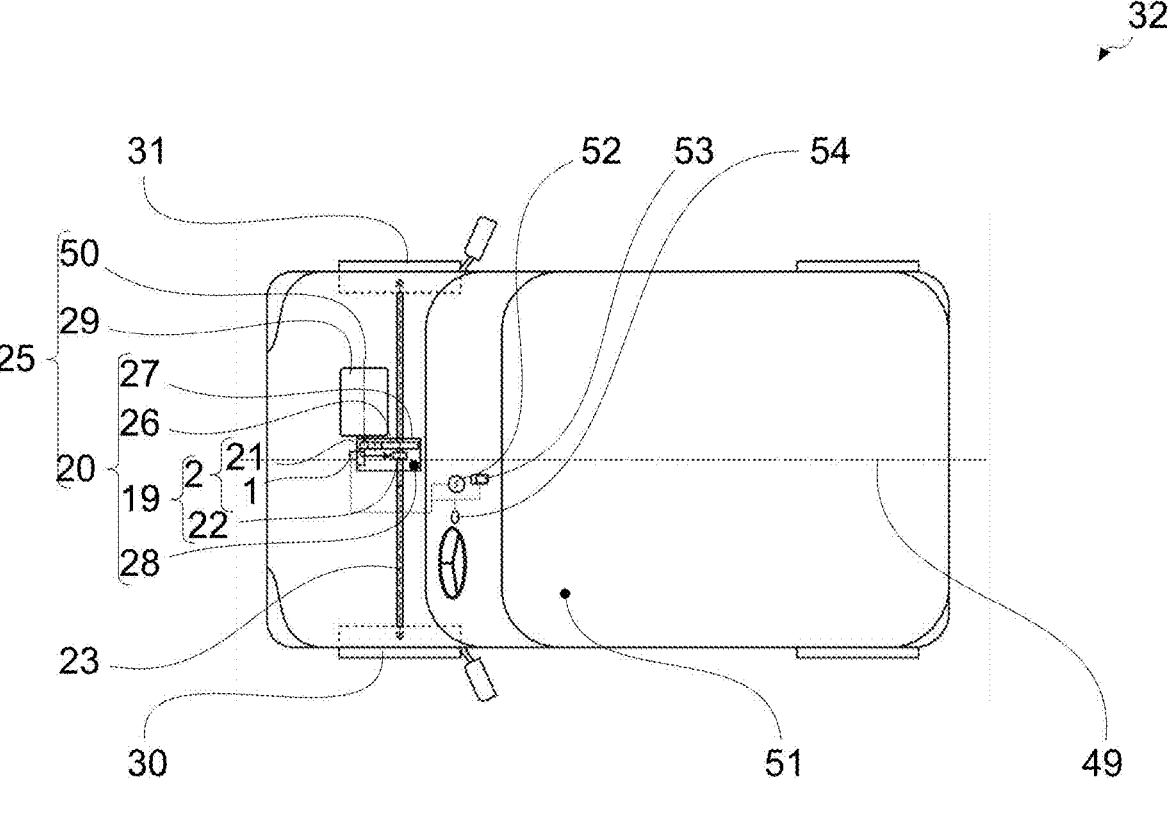
FIG. 9: shows a drive train with a parking lock device in a motor vehicle.

FIG. 9 shows a purely schematic plan view of a motor vehicle 32 with a drive train 25, wherein a drive engine 29, optionally shown here as an electric drive engine 29, is arranged perpendicularly to a longitudinal axis 49, along a motor axis 50. The motor axis 50 is arranged in front of a driver's cab 51 of the motor vehicle 32 in the direction of travel. The drive train 25 is configured to propel the motor vehicle 32 by driving a left-hand drive wheel 30 and a right-hand drive wheel 31 (here optionally the front axle of the motor vehicle 32) by means of a torque output from the engine 29 via a transmission 20, and thus a torque flow 23 (shown by dashed lines here with the direction corresponding to a tensile torque). For example, a torque transmission gear 26 is part of a gear 20 which can be shifted by a vehicle driver by means of a gear shift lever 52 in the driver's cab 51.

A parking lock device 19 is now arranged in the torque flow 23, with which the left-hand drive wheel 30 and the right-hand drive wheel 31 can be blocked. The parking lock device 19 comprises a ratchet wheel 22, for example a gear wheel of the torque transmission gear 26 of the transmission 20 or an additional wheel of the torque transmission gear 26, and a parking lock 2, wherein the parking lock 2 comprises a locking mechanism 21 and an actuator 1. The locking mechanism 21 is designed, for example, as shown in FIG. 1. One embodiment of the parking lock device 19 is shown here, in which (optionally) the locking mechanism 21 is arranged within the transmission compartment 28 in a transmission housing 27 of the gear 20 and the actuator 1 is arranged outside of the gear housing 27.

The ratchet wheel 22 is arranged in the torque flow 23 in such a way that it can prevent the motor vehicle 32 from rolling away. The parking lock device 19 can be actuated here with at least one of the following operating elements:

by a gear shift lever 52, for example by means of a park shift position "P";

a parking lever 53; and/or an ignition button 54 (alternatively an ignition key).

Furthermore, the parking lock device 19 can be actuated automatically; for example, when the motor vehicle 32 is exited (for example after it has been locked), the parking lock 2 is automatically engaged.

With the actuator proposed here, both the driving position and the parking position can be held passively. Additionally, the parking lock state deviating from the normal state (e.g., the free state) can be overridden with very little power consumption.

| LIST OF REFERENCE SYMBOLS | |
|---|---|
| 1 | Actuator |
| 2 | Parking lock |
| 3 | Axial drive means |
| 4 | Axial force |
| 5 | Actuation element |
| 6 | Actuation axis |
| 7 | First energy storage element (ram) |
| 8 | Second energy storage element (holding element) |
| 9 | Storage force |

-continued

| LIST OF REFERENCE SYMBOLS | |
|---|---|
| 10 | Stopper element |
| 11 | Stopper component |
| 12 | Holding element |
| 13 | Lifting magnet |
| 14 | Coil |
| 15 | Magnetic force |
| 16 | Lifting piston |
| 17 | Position magnet |
| 18 | Magnetic field sensor |
| 19 | Parking lock device |
| 20 | Transmission |
| 21 | Locking mechanism |
| 22 | Ratchet wheel |
| 23 | Torque flow |
| 24 | Unlocking element |
| 25 | Drive train |
| 26 | Torque transmission gear |
| 27 | Transmission housing |
| 28 | Transmission compartment |
| 29 | Drive engine |
| 30 | Left drive wheel |
| 31 | Right drive wheel |
| 32 | Motor vehicle |
| 33 | Parking lock pawl |
| 34 | Pawl axis |
| 35 | Traverse |
| 36 | Preloading spring |
| 37 | Frame |
| 38 | Release spring |
| 39 | Wheel axle |
| 40 | Pivot axis |
| 41 | Actuation tip |
| 42 | Slave piston |
| 43 | Slave cylinder |
| 44 | Counter bearing |
| 45 | Stopper force |
| 46 | Holding force |
| 47 | Pre-holding force |
| 48 | Ramp |
| 49 | Longitudinal axis |
| 50 | Motor axis |
| 51 | Driver's cab |
| 52 | Transmission shift lever |
| 53 | Parking lever |
| 54 | Ignition button |
| 55 | Axial gap |
| 56 | Inner return circuit |
| 57 | Outer return circuit |
| 58 | Gap normal |
| 59 | Actuation head |

The invention claimed is:

1. An actuator for a parking lock of a motor vehicle, comprising:

an axial drive means for transmitting an axial force;

an actuation element having an actuation axis configured to be axially moved from a first normal position to a second deflected position via the axial force of the axial drive means;

a stopper element;

a stopper component corresponding to the stopper element;

a holding element configured to be moved between a released position and a locking position, and the stopper element and the stopper component are fixed to each other when the actuation element is in the second deflected position while the holding element is in the locking position;

a lifting magnet comprising a coil and a lifting piston configured to be axially moved via a magnetic force generated by the coil, and the holding element is rigidly connected to the lifting piston, and wherein:

a magnetic flux generated by the coil is conducted through a return circuit, and the return circuit comprises a radially inner return circuit and a radially outer return circuit, and an axial gap is present between a first surface of the lifting piston and a second surface of the radially inner return circuit in at least one of the released position or the locking position of the holding element, and the magnetic flux is conducted through the first surface and the second surface which form the axial gap.

2. The actuator according to claim 1, wherein the first surface of the lifting piston and the second surface of the radially inner return circuit are aligned with one another so that when the coil is energized, the lifting piston is moved toward the radially inner return circuit so that the axial gap is reduced.

3. The actuator according to claim 2, wherein the lifting piston and the radially inner return circuit are configured to be brought into contact with one another.

4. The actuator according to claim 2, wherein the axial gap is inclined.

5. The actuator according to claim 1, wherein the lifting magnet further comprises a second energy storage element configured to apply a pre-holding force to the lifting piston, the pre-holding force antagonistic to the magnetic force.

6. The actuator according to claim 1, wherein the coil is accommodated by the radially inner return circuit, and the radially inner return circuit is arranged coaxially to the actuation axis and at least partially axially overlaps at least one of the actuation element or a slave piston comprised by the axial drive means.

7. The actuator according to claim 6, wherein the outer return circuit is rigidly connected to the radially inner return circuit via an interference fit.

8. A parking lock for a parking lock device of a transmission of a motor vehicle, comprising:

a locking mechanism configured for locking a ratchet wheel in a torque flow, the locking mechanism configured to block the ratchet wheel in a locked state of the locking mechanism and release the ratchet wheel in a free state of the locking mechanism; and an actuator according to claim 1, and wherein in the second deflected position of the actuation element, the locking mechanism is moved out of the locked state, and wherein the first normal position of the actuation element corresponds to the locked state of the locking mechanism.

9. The parking lock according to claim 8, further comprising an unlocking element configured to be movable between a normal position and an unlocking position, and in the unlocking position of the unlocking element, the free state of the locking mechanism is maintained, and in the normal position of the unlocking element, a normal locking function of the parking lock is ensured.

10. A parking lock device for a motor vehicle, comprising:

a ratchet wheel arranged in a lockable torque flow; and a parking lock according to claim 8, and wherein the ratchet wheel is configured to be locked via the locking mechanism.

11. A transmission for a drive train of a motor vehicle, comprising:

the parking lock device according to claim 10;

a torque transmission gear comprising the ratchet wheel; and a transmission housing configured to surround a transmission compartment, and wherein the locking mechanism of the parking lock is arranged in the transmission compartment.

12. A drive train for a motor vehicle, comprising:

at least one drive engine configured for delivering a torque;

at least one consumer for receiving the torque; and the transmission according to claim 11, and wherein the at least one drive engine and the at least one consumer are connected to one another in a torque-transmitting manner via the transmission, and the torque transmitted between the at least one drive engine and the at least one consumer is prevented via the parking lock device when the locking mechanism is in the locking state.

13. A motor vehicle, comprising:

at least one drive wheel; and a drive train according to claim 12, wherein, in order to propel the motor vehicle, a torque is transmitted from the at least one drive engine of the drive train to the at least one drive wheel, and rolling of the motor vehicle is prevented via the parking lock device in the locked state of the locking mechanism.

14. The actuator according to claim 2, wherein the axial gap is aligned parallel to the actuation axis.

15. The actuator according to claim 5, wherein the magnetic force is a tensile force.

16. The transmission according to claim 11, wherein the entire parking lock device is arranged in the transmission compartment.

17. An actuator for a parking lock of a motor vehicle, comprising:

an actuation element having an actuation axis configured to be axially moved from a first normal position to a second deflected position via an axial force;

a stopper element;

a stopper component corresponding to the stopper element;

a holding element configured to be moved between a released position and a locking position, and the stopper element and the stopper component are fixed to each other when the actuation element is in the second deflected position while the holding element is in the locking position;

a lifting magnet comprising a coil and a lifting piston configured to be axially moved via a magnetic force generated by the coil, and the holding element is rigidly connected to the lifting piston, and wherein:

a magnetic flux generated by the coil is conducted through a return circuit, and the return circuit comprises a radially inner return circuit and a radially outer return circuit, and an axial gap is present between a first surface of the lifting piston and a second surface of the radially inner return circuit in at least one of the released position or the locking position of the holding element, and the magnetic flux is conducted through the first surface and the second surface which form the axial gap.

18. The actuator according to claim 17, wherein the first surface of the lifting piston and the second surface of the radially inner return circuit are aligned with one another so that when the coil is energized, the lifting piston is moved toward the radially inner return circuit and the axial gap is reduced.

19. The actuator according to claim 18, wherein the lifting piston and the radially inner return circuit are configured to be brought into contact with one another.

20. The actuator according to claim 17, wherein the lifting magnet further comprises a second energy storage element configured to apply a pre-holding force to the lifting piston, the pre-holding force antagonistic to the magnetic force.

* * * * *